United States Patent [19]

Nield

[11] 4,368,288

[45] Jan. 11, 1983

[54] FAST CRYSTALLIZING POLYESTER COMPOSITIONS

[75] Inventor: Eric Nield, Watton-at-Stone, England

[73] Assignee: Imperial Chemical Industries Limited, London, England

[21] Appl. No.: 298,282

[22] Filed: Sep. 1, 1981

Related U.S. Application Data

[63] Continuation of Ser. No. 159,919, Jun. 16, 1980, abandoned.

[30] Foreign Application Priority Data

| Sep. 21, 1979 [GB] | United Kingdom | 7932818 |
| Dec. 12, 1979 [GB] | United Kingdom | 7942879 |
| Jan. 11, 1980 [GB] | United Kingdom | 8001009 |
| Mar. 12, 1980 [GB] | United Kingdom | 8008300 |

[51] Int. Cl.³ .............................................. C08K 5/09
[52] U.S. Cl. ........................... 524/539; 525/437; 525/444; 524/115; 524/323; 528/272
[58] Field of Search ......... 260/40 R, 45.7 R, 45.7 PS, 260/45.85; 525/437, 444, 5; 524/115, 323, 539; 528/272

[56] References Cited

U.S. PATENT DOCUMENTS

| 3,367,926 | 2/1968 | Veaks | 260/93.5 |
| 3,761,450 | 9/1973 | Herwig et al. | 525/437 |
| 3,966,671 | 6/1976 | Smith | 260/40 R |
| 4,207,230 | 6/1980 | Bier et al. | 525/437 |
| 4,215,032 | 7/1980 | Kobayashi et al. | 525/437 |

FOREIGN PATENT DOCUMENTS

| 1945967 | 3/1971 | Fed. Rep. of Germany . |
| 2014770 | 7/1978 | Fed. Rep. of Germany . |
| 2756013 | 6/1979 | Fed. Rep. of Germany . |
| 1249535 | 10/1971 | United Kingdom . |
| 1282679 | 7/1972 | United Kingdom . |
| 1300308 | 12/1972 | United Kingdom . |
| 1426524 | 3/1976 | United Kingdom . |
| 1439964 | 6/1976 | United Kingdom . |
| 1451945 | 10/1976 | United Kingdom . |
| 1495478 | 12/1977 | United Kingdom . |
| 1523219 | 8/1978 | United Kingdom . |

*Primary Examiner*—Lucille M. Phynes
*Attorney, Agent, or Firm*—Cushman, Darby & Cushman

[57] ABSTRACT

Fast crystallizing polyester compositions obtained by reacting a polyester which is a block copolyester containing the repeating polymeric segments A and B wherein A is a polymeric segment of ethylene terephthalate units and B is a polymeric segment having a glass-transition temperature of less than 0° C. and preferably less than −20° C., the concentration of the segments of B being between 0.05 and 10 mole % preferably 0.1 to 5 mole % of the block copolyester, and an ionizable metal salt of an organic compound having at least one acidic proton using a concentration of ionizable metal salt which will convert at least 4% of the end groups of the polyester into carboxylate end groups but is insufficient to result in the melt degradation performance of the composition being substantially inferior to that of the polyester in the absence of the salt.

12 Claims, No Drawings

FAST CRYSTALLIZING POLYESTER COMPOSITIONS

CROSS REFERENCE TO RELATED APPLICATIONS

This application is a continuation of my earlier application Ser. No. 159,919 filed June 16, 1980, now abandoned.

This invention relates to fast crystallising polyester compositions containing difunctional aromatic acids and more particularly to such compositions wherein a major part of the polyester is formed of ethylene terephthalate units.

The commercial development of polyethylene terephthalate, hereinafter termed PET, as a moulding powder for use in injection moulding machines has been hampered because the cycle time for moulding of dimensionally stable articles is somewhat longer than that for other plastics of the engineering type. This is primarily due to the fact that the moulded composition does not reach a crystalline condition as rapidly as the other plastics. Premature ejection from the mould of an insufficiently crystallised moulding would mean that the article could continue to crystallise when in service with appropriate volume changes. A further disadvantage of PET is that it requires the moulds to be maintained at a temperature of about 120° C. in order to achieve satisfactory results. Whilst a wide variety of nucleants have previously been suggested as being suitable for bringing about rapid crystallisation of polyesters most of these are either inefficient as nucleants or bring about a marked degradation of the polyester under processing conditions. Thus finely-divided inorganic nucleants such as talc are not very efficient nucleants, and efficient nucleants such as sodium benzoate cause marked degradation of polyesters such as polyethylene terephthalate and polytetramethylene terephthalate.

Compositions according to the present invention enable the temperature of the moulds to be reduced below 120° C. whilst at the same time enabling rapid crystallisation to take place and good surface properties to be achieved on the mouldings without unacceptable degradation occurring.

According to the invention there is provided a fast crystallising polyester composition obtained by reacting a polyester having an intrinsic viscosity of greater than 0.3 which polyester comprises aromatic or cycloaliphatic residues obtained from diacids and/or hydroxyacids and aliphatic, aromatic or cycloaliphatic residues of diols with an ionisable metal salt of an organic compound having at least one acidic proton characterised in that the composition contains sufficient of the ionisable metal salt to result in at least 4% of the ends groups of the polyester being converted to carboxylate end groups but insufficient to result in the melt degradation performance of the polyester determined as hereinafter described being substantially inferior to that of the polyester in the absence of the salt.

The melt degradation performance is a measure of the extent of degradation under molten conditions. A convenient method of quantifying the performance is by measuring the "K value". A method for determining this value in the molten state using an Instron Capillary rheometer is given in a paper by J Devaux et al in Makromol. Chem. 179, 2201–2209 (1978).

This method is carried out on samples prepared by reacting the salt with the polyester on a 2 roll-mill at a temperature above the melting point of the polyester for 5 minutes and then pressing the product obtained into a 2 mm thick sheet using the same temperature for 3 minutes before cooling to room temperature. The method is described for polyethylene terephthalate but can be readily adapted for other polyesters.

In the case of polyethylene terephthalate this method gives a K value of 55. By "a performance which is not substantially inferior" is meant that the K value for the polyester containing the salt should not be more than 10% higher than the value of polyester alone. For polyethylene terephthalate the K value in the presence of salt should be less than 60.

The choice of ionisable metal salts of organic compounds having at least one acidic proton having the required performance when mixed with the polyester under molten conditions is readily determined using the above characterising tests.

The preferred choice of metal is from the group of alkaline metal compounds including sodium, potassium, lithium and calcium. Sodium salts are preferred.

The extent to which the ionisable salt improves the crystallisation performance of the composition with respect to the polyester alone thereby enabling satisfactory mouldings to be obtained using shorter cycle times and/or lower mould temperatures can be assessed by a number of methods using differential scanning calorimetry techniques. For example, a useful criterion is the crystallisation peak temperature difference which involves comparison of values, for the composition containing the salt and the polyester alone, obtained for the crystallisation peak observed on heating the sample at a constant rate. For polyethylene terephthalate excellent performance is obtained when the crystallisation peak temperature difference as hereinafter defined is at least 20° C.

The organic compounds having at least one acidic proton from which the ionisable metal salt is formed are preferably organic acids selected from carboxylic, sulphinic, phosphonic and phosphinic acids and phenols. Particularly suitable are aromatic organic acids containing an aromatic ring structure which may consist of a single ring, fused rings or multiple rings linked by a direct bond or by, for example, links of the following types —O—, —CO—, —O—CH$_2$—CH$_2$—O—, —SO$_2$—, —NH, and —(CH$_3$)$_2$—. The ring structures may consist entirely of C atoms or may be heterocyclic aromatic rings such as thiophen or furan rings. The aromatic rings should not be substituted by more than one carboxylic acid or carboxylic acid ester group directly linked to any one aromatic ring. However, excellent results are obtainable from acids containing more than one carboxylic acid or carboxylic acid ester group providing they are present on different rings. A useful criterion for choosing a suitable acid to form the ionisable salt is the dissociation constant of the acid. Acids which have a dissociation constant of greater than $10^{-1}$, measured at 23° C. in aqueous solution, give ionisable salts which are not sufficiently reactive to confer the property of rapid crystallisation on the polyester composition.

A useful class of aromatic organic acids are those of the formula:

$$R\text{---}(X)_n\text{---}(A)_m$$

where A is an acid group selected from the carboxylic, sulphinic, phosphonic, phosphinic and phenol groups, m is an integer which is at least one, X is a direct link or is a —CH=CH— or a —CH$_2$— group, n is an integer between 1 and 4 and R is an aromatic structure consisting of single, fused or multiple aromatic rings. The preferred acid group is the carboxylic group.

When X is a direct link, A is a carboxyl group, m is one and R is a benzene ring then R preferably contains at least one substituent group other than the carboxylic acid group. Particularly suitable are benzoic acids which contain at least one substituent selected from the nitro, halogen, hydroxy, phenyl and oxyphenyl radicals. Specific examples of substituted benzoic acids are sodium, potassium and lithium salts of ortho-hydroxy benzoic acid, meta-hydroxy benzoic acid, 2,4-dihydroxy benzoic acid, 2,5-dihydroxy benzoic acid, 2,4,6-dihydroxy benzoic acid, ortho-nitrobenzoic acid, meta-nitrobenzoic acid, para-nitrobenzoic acid, 3,5-dinitrobenzoic acid, ortho-chlorobenzoic acid, para-chlorobenzoic acid, meta-chlorobenzoic acid, 2,4-dichlorobenzoic acid, para-fluorobenzoic acid, para-oxyphenyl benzoic acid, 2-chloro-4-nitrobenzoic acid and 2-chloro-5-nitro benzoic acid.

The effect of these acids is surprising in view of the fact that salts of a similar nature which have previously been suggested as nucleants, such as salts of terephthalic acid, show little nucleating activity. Thus, sodium or potassium monomethyl terephthalate or disodium terephthalate have only slight nucleating activity.

When X is either a —CH=CH— or a —CH$_2$— group, R may be unsubstituted or may contain at least one substituent selected from the group halogen, nitro, amino, hydroxy, alkyl, alkoxy or aryl radicals. Specific examples are 3-phenylacetic acid, 3-phenyl propionic acid, 4-phenyl butyric acid, and 1-naphthyl acetic acid.

When X is a direct link and R consists of fused or multiple aromatic rings or is a ring other than a benzene ring, the rings need not contain substituent groups in addition to an acid group. Specific examples are 2-furoic acid, 1-naphthoic acid, 2-naphthoic acid, 2-biphenyl carboxylic acid, 2-thiopen carboxylic acid, and 3-hydroxy-2-naphthoic acid.

It has been found that acids of the formula R—X$_n$—COOH as hereinbefore defined, provide compositions having favourable nucleation and degradation characteristics when the product $\delta \times pK_{H_2O}$ for the acid is greater than 55.

The $\delta \times pK_{H_2O}$ of the acid is a parameter of the substituted acid, which may be defined as follows: The $\delta$ factor is the parameter of solubility of the acid defined by the formula:

$$\delta = \frac{d \cdot \Sigma Fi}{M}$$

in which d is the density of the acid, Fi is the value of the cohesive energy of the acid-forming groups and n is the molecular weight of the acid (see Polymer-Polymer Miscibility, by Olabisi and al, Academic Press, New York, page 57 (1979)).

The $pK_{H_2O}$ is the negative logarithm of the dissociation constant of the substituted benzoic acid from which the salt is derived (nucleating agent), this constant being measured by titration of the acid by sodium hydroxide in water. The $pK_{H_2O}$ values given in this specification have been found in the Handbook of Tables for Organic Compound Identification, 3rd edition, CRC Press, Cleveland, USA.

Other organic compounds having at least one acidic proton from which suitable ionisable salts can be formed are compounds containing a group of the formula >NH.

The salts may be formed from any nitrogen compound containing acid hydrogen but particularly suitable compounds include compounds of the formula:

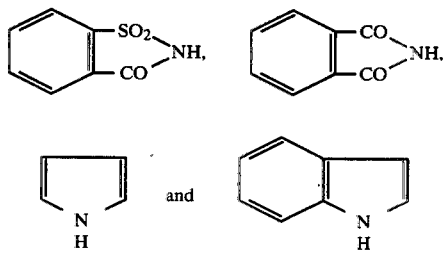

Also suitable are salts of acid amides, sulphonamides, such as N-ethyl-p-toluene sulphonamide, and lactams such as caprolactam, and polyamides.

The amount of nucleating agent to be reacted with the polyester to give the required carboxylate end-group concentration and effective nucleation may vary between wide limits but should not be so high as to induce melt degradation. The crystallisation rate increase effect of the nucleating agents used in accordance with this invention is apparent when as little as 0.05% by weight of said nucleating agent is added to the polyethylene terephthalate. Excellent results have been obtained when about 0.25 to 2% by weight, particularly about 1%, of the nucleating agents have been incorporated into the polyester.

The ionisable salts may be introduced into the compositions by any of the conventional methods for introducing additives into melts of polyesters. Preferably the compositions may be prepared by melt compounding techniques in mechanical mixers, such as a screw extruder.

The invention also includes polyester compositions in which the ionisable metal salt of the organic compound containing at least one acidic proton is provided by forming the salt in situ.

The polyester used in the composition of the invention may be any polyester which contains residues of aromatic or cycloaliphatic diacids or hydroxyacids and aliphatic, aromatic or cycloaliphatic residues of diols. Polyesters containing at least 90 mole % of ethylene terephthalate are particularly suitable as these are readily available and have suitable physical properties for use as engineering polymers. They may be made up wholly of ethylene terephthalate units or may contain minor amounts of copolymerised units which do not substantially alter the character or properties of the homopolymer. On the other hand the polyesters may contain polymeric segments having a glass-transition temperature of less than 0° C. and preferably less than −20° C. so that the character of the polyester is radically changed by internal plasticisation.

The polymeric segments preferably have a molecular weight in the range 500 to 10,000 and desirably between 1000 and 5000. The polymer used must be capable of undergoing polycondensation with the segments of PET through reactive end groups such as hydroxyl or carboxyl groups or of being linked to PET segments by the use of chain extenders. They must be thermally and chemically stable under the conditions necessary to form the block copolymer. Typically suitable are polyethylene glycol, polyethylene adipate, polypropylene glycol, polybutylene glycol, polybutylene adipate, polycaprolactone, polydecamethylene glycol, polyethylene sebacate, polyethylene azelate and polyoxydiethylene sebacate.

The concentration of the polymeric segments should be between 0.05 and 10 mole %, preferably 0.1 to 5 mole % of the block copolyester.

Accordingly there is also provided a fast crystallising polyester composition obtained by reacting a polyester which is a block copolyester containing the repeating polymeric segments A and B wherein A is a polymeric segment of ethylene terephthalate units and B is a polymeric segment having a glass-transition temperature of less than 0° C. and preferably less than −20° C., the concentration of the segments of B being between 0.05 and 10 mole % preferably 0.1 to 5 mole % of the block copolyester, and an ionisable metal salt of an organic compound having at least one acidic proton characterised in that the composition contains sufficient of the ionisable metal salt to result in at least 4% of the end groups of the polyester being converted to carboxylate end groups but insufficient to result in the melt degradation performance of the polyester determined as hereinbefore described being substantially inferior to that of the polyester in the absence of the salt.

The block copolyesters containing such segments may be obtained from monomeric constituents of PET and the low glass-transition temperature segments by conventional means. For example, copolymers may be made by heating dimethyl terephthalate, ethylene glycol and the polymeric segment in the presence of an appropriate catalyst at about 200° C. until ester interchange is complete and thereafter heating at 275° C. to effect the poly-condensation. Alternatively, a preformed polymer of the polyester or a polyester diol can be compounded under melt conditions with an appropriate reactive polymeric segment. Chain extenders, such as isocyanates, epoxides, phenyl esters and carbonates, may also be included in a melt compounding process. The melt compounding process is also useful for preparing block copolyesters having various concentrations of the polymeric segment from copolyesters having a higher concentration of the polymeric segment. In this "let-down" process PET may be melt blended, for example, with a copolyester of PET containing 10 mole % of polyethylene oxide segments to give a copolyester containing a polyethylene oxide concentration which has been reduced in proportion to the total concentration of ethylene terephthalate units in the final composition.

The use of block copolymers of the type described are particularly useful because such block copolymers have a greater tendency to crystallise rapidly without the need to add an external plasticiser. In the case of PET homopolymers or when there is insufficient of any component in the polyester able to effect internal plasticisation of the polyester it is advantageous to add an external plasticiser. Suitable external plasticisers for use with PET are described in British Patent Applications published as GB No. 2 015 013 and GB No. 2 015 014.

The compositions may also contain a variety of auxiliary additives, for example, for improving the thermal, oxidative and light stability of the polyester or a variety of other additives such as fillers, pigments, colourants, flame retardants, chain extenders and mould release agents. The addition of known nucleating agents are also included in the invention.

The compositions are particularly useful for use in engineering applications when they contain particulate or fibrous fillers because these materials can signficantly enhance the mechanical properties of the composition. Of the fibrous fillers, glass fibre is most widely used and are commercially available in a variety of types. The most suitable type for giving optimum levels of mechanical properties will depend to a significant extent on the nature of the size applied to the glass. Manufacturers of glass fibres apply a variety of sizes for promoting bonding between the polymer and the glass. The most suitable glass may be chosen by examination of the properties obtained when the glass is incorporated in the composition or the advice of the glass fibre manufacturer may be sought to obtain a fibre suitable for use in polyester compositions. Suitable glasses are OCF 277B or OCF 419AA, obtainable from Owens Corning Fibreglas. The compositions may contain from 5 to 80% by weight of the composition of glass fibre.

The composition may additionally, or alternatively, contain a variety of mineral fillers such as clays, mica, calcium metasilicate, glass beads, pulverised fuel ash and hollow glass spheres and other materials which act not only as cheap fillers but also significantly enhance some mechanical properties of the composition. As with the glass fibre it is advantageous to use fillers which have been surface treated with adhesion-promoting materials such as silanes.

The compositions of the invention may also include other polymeric materials. The blend of such compositions will normally contain less than 50% of the composition of other polymeric materials. Particularly useful are compositions containing polymeric impact improvers, for example, of the types described in U.S. Pat. Nos. 4,034,013 and 4,096,202. Other suitable impact improvers include ethylene vinyl acetate, ethylene acrylic ester and carboxyl containing ethylene copolymers.

The fast crystallising characteristics of the compositions of the invention may be determined by subjecting small samples of the composition to differential scanning calorimetry techniques in addition to the practical test of determining the fastest rate at which articles may be injection moulded whilst retaining dimensional stability and good surface properties. In one such DSC technique the crystallisation peak temperature difference, Tn(composition)-Tn(polyester) is determined by measuring the crystallisation peak temperatures on heating for the composition in comparison with the polyester of the composition not containing the ionisable salt. The detailed procedure is as follows. Compositions were prepared from the polyester and the additive by mixing on a 2-roll mill at 300° C. for 2 minutes. The sample was taken from the mill and pressed into a film in a compression moulding machine. 10 mg samples of the composition were placed in a capsule, rapidly heated to 290° C. and maintained at that temperature for 1 minute. The capsule was then dropped into water to quench the polymer and prevent crystallisation. The sample was then placed in a Perkin Elmer DSC 2 machine and heated at a rate of 10° C./minute until reaching a temperature of 290° C. The crystallisation peak temperature observed on this heating cycle is recorded and compared with the value for the polyester not containing the additive. For polyethylene terephthalate compositions this value is preferably at least 20° C.

An alternative method for assessing the effectiveness of nucleation of an additive is to compare the difference between the value of the crystallisation peak on cooling (Tc) with that on heating (Tn) for a composition containing an ionisable salt. The value obtained from this comparison, $Tc_{(cooling)} - Tn_{(heating)}$ is termed $\Delta T$. The preferred nucleating agents of the composition have a $\Delta T$ of at least 100° C. for polyethylene terephthalate compositions when measured according to the following procedure. Samples of polyester together with 1% of the salt under test were mixed in a 2-roll mill at 270° C. for 5 minutes. The sample produced was pressed into 2 mm thick sheets at 270° C. for 3 minutes and then cooled to room temperature. 10 mg of the sample was placed in a capsule and rapidly heated to 290° C. After maintaining this temperature for 1 minute the capsule was quenched in water. The crystallisation peak temperatures on heating (Tn) and cooling (Tc) were determined using heating and cooling rates of 10° C./minute on a Perkin Elmer DSC 2 machine.

Other variations of these tests may be used as indicated in the Examples.

The total number of end groups in the polyester were found by determining the intrinsic viscosity of the polyester and using the correlation between I.V. and number of end groups given in Transactions of the Faraday Societ 1961, Volume 57, pages 150 to 159. The numbers of hydroxyl and carboxyl groups were also determined according to the procedure given in this paper.

A further useful characterising test involves measuring the melt viscosity of the composition after compounding in a screw extruder. This characterisation is important not only to measure the extent of polyester degradation (shown by a reduction in viscosity) but also to determine the extent to which the melt viscosity is increased. Some additives can increase the melt viscosity to such an extent that the flow properties of the molten composition become unsuitable for moulding purposes. The method used for this characterisation is as follows. The polyester mixed with the ionisable salt is compounded in an 18 mm Betol screw extruder using a screw speed of 50 rpm and a temperature profile sufficient to ensure complete melting of the polyester. After stable running is achieved a sample is collected at the extruder die and stored in a vacuum oven at 80° C. The melt viscosity of the sample is measured on a melt grader. For polyethylene terephthalate compositions a temperature of 270° C., a load of 2 Kg and a die 1.18 mm in diameter and 8 mm long are employed. The shear stress ($\rho s$), under these conditions, is $1.15 \times 10^4 N^{-2}$. Taking the melt density of PET to be 1200 Kgm$^{-3}$, the shear rate ($\gamma$) is calculated from:

$$\dot{\gamma} = \frac{M}{T} \times 5.167 \times 10^3$$

where
M = mass extruded in time T (g$^{-1}$).
The viscosity ($\eta$) is then given by:

$$\eta = \frac{\sigma s}{\dot{\gamma}} \text{ Nsm}^{-2}$$

The melt viscosity of the polyester of the composition not containing the ionisable salt is measured in the same way after the same treatment in the extruder. Preferred compositions have a melt viscosity value which is not greater than 1.5 times the value for the polyester alone.

The invention is further illustrated by reference to the following examples.

EXAMPLE 1

10 g of granulated polyethylene terephthalate (such as the B 90 grade of polyethylene terephthalate manufactured by ICI, United Kingdom) are converted into fine particles in a suitable grinding apparatus, such as a ball mill.

0.05 gram of sodium 2-chloro-4-nitrobenzoate are dissolved in 5 ml of methanol.

The methanol solution of the nucleating agent is then poured onto the powdered polyethylene terephthalate and the slurry is stirred, during 5 minutes at room temperature.

The so-treated polyethylene terephthalate is then dried during 24 hours firstly at room temperature and then during 48 hours at 60° C., so as to obtain a dry powder of the polyethylene terephthalate composition.

The following table shows the surprising crystallisation rate increase effect obtained when using the nucleating agents according to this invention.

A DSC 2 Perkin Elmer scanning calorimeter was used.

10 mg of the sample of polymer material are placed in a capsule and introduced into the apparatus, wherein the sample is quickly heated to a temperature of 290° C. at which it is maintained during 1 minute.

The molten polymer material is then very quickly cooled by means of liquid air (at a rate of 320° C. per minute) until the crystallisation temperature is reached.

The crystallisation isotherm is registered on a temperature-time graph and the peak appearing on the registered isotherm is taken as the half-crystallisation time ($t_{\frac{1}{2}}$).

| Tc (°C.) | 190 | 180 | 140 | 130 | 120 |
|---|---|---|---|---|---|
| $t_{\frac{1}{2}}$ (sec)[1] | 26 | 14 | 11 | 20 | 48 |
| $t_{\frac{1}{2}}$ (sec)[2] | 116 | 99 | 50 | 60 | 145 |

[1] Nucleated PET prepared by the method according to this invention;
[2] pure PET.

EXAMPLE 2

The same method as described in Example 1 is used, except that the concentration of sodium 2-chloro-4-nitrobenzoate has been changed, this concentration being respectively of 0.1, 0.5, 1 and 2% by weight.

| Tc (°C.) | $t_{\frac{1}{2}}$ (sec) | | | | |
|---|---|---|---|---|---|
| | 0 | 0.1% | 0.5% | 1% | 2% |
| 180 | 99 | 35 | 14 | 11 | 11 |
| 190 | 116 | 55 | 26 | 20 | 18 |
| 200 | — | — | — | 34 | 19 |

EXAMPLE 3

The melt viscosity of the nucleated PET according to this invention has been measured and compared to the melt viscosity of pure PET and of PET nucleated with 1% of sodium benzoate and of PET nucleated with sodium p-tert-butylbenzoate. The melt viscosity has been measured with an Instron Capillary rheometer after 20 minutes of residence of the sample at 290° C.

| Sample | Melt viscosity (poises) |
|---|---|
| PET | 640 |
| PET + 1% sodium benzoate | 240 |
| PET + 1% sodium p-tert-butylbenzoate | 280 |
| PET + 1% sodium-2-chloro-4-nitrobenzoate | 550 |

This table shows clearly that the polyethylene terephthalate nucleated according to this invention is substantially more stable than PET nucleated with 1% conventional nucleating agent, such as sodium benzoate or p-tert-butylbenzoate. The melt viscosity of the PET nucleated according to this invention remains practically equivalent to that of pure PET.

EXAMPLE 4

The polyethylene terephthalate is mixed in a Brabender plastograph with about 2% by weight of sodium 2-chloro-4-nitrobenzoate. The following half-crystallisation times are obtained:

| Tc (°C.) | $t_{\frac{1}{2}}$ (sec) |
|---|---|
| 180 | 4 |
| 190 | 9 |
| 200 | 15 |

EXAMPLE 5

The salts listed in Table 1 were evaluated according to the following tests. In these tests, a proportion of 1% of the nucleating agent has been added to PET in a 2-roll mill mixer at 270° C. during 5 minutes. The sample was then pressed into 2 mm thick sheets during 3 minutes at 270° C. and cooled to room temperature. The following Table 1 gives the results of the tests made with the mixture of PET and of the nucleating agent. In said table:

$\Delta T$ and $\delta \times pK_{H2O}$ have the above meanings;

$t_{\frac{1}{2}}$ is the half-crystallisation time (in seconds) of the samples measured at the indicated temperatures (°C.) after melting during 1 minute at 290° C.;

K is the degradation constant of the PET in the presence of the nucleating agent obtained by measuring the viscosity in the molten state (290° C.) of the sample in an Instron Capillary rheometer by the method described by J Devaux et al in Makromol. Chem. 179, 2201–2209 (1978).

In the following Table 1, the results of tests are also given for compositions which are not in the scope of this invention, i.e. those containing 1% of sodium benzoate and sodium para-tert-butylbenzoate.

TABLE 1

| | | | | | | $t_{\frac{1}{2}}$ (sec) | |
|---|---|---|---|---|---|---|---|
| | δ | $pK_{H2O}$ | $\delta \times pK_{H2O}$ | K | ΔT | 120° C. | 110° C. |
| Nucleating agents according to the invention | | | | | | | |
| Sodium salts of: | | | | | | | |
| ortho-hydroxy benzoic acid | 14 | 3 | 42 | 26 | 105 | 40 | 80 |
| meta-hydroxy benzoic acid | 14 | 3.9 | 54 | 86 | 91 | 55 | 165 |
| 2,4-dihydroxy benzoic acid | 14.7 | 3.2 | 47 | 35 | 99 | 45 | 95 |
| 2,5-dihydroxy benzoic acid | 14.7 | 3 | 44 | 22 | 103 | 48 | 85 |
| 2,4,6-dihydroxy benzoic acid | 15.3 | 1.7 | 26 | 37 | 97 | 50 | 110 |
| ortho-ONa-benzoic acid | 14 | 3 | 42 | 24 | 110 | 49 | 70 |
| ortho-nitrobenzoic acid | 13.5 | 2.2 | 30 | 20 | 106 | 45 | 65 |
| meta-nitrobenzoic acid | 13.5 | 3.4 | 46 | 49 | 105 | 45 | 65 |
| para-nitrobenzoic acid | 13.5 | 3.4 | 46 | 79 | 102 | 54 | 75 |
| 3,5-dinitrobenzoic acid | 13.7 | 2.8 | 38 | 44 | 102 | 45 | 85 |
| ortho-chlorobenzoic acid | 12.4 | 3 | 37 | 32 | 108 | 36 | 65 |
| para-chlorobenzoic acid | 12.4 | 4 | 50 | 64 | 102 | 40 | 90 |
| meta-chlorobenzoic acid | 12.4 | 3.8 | 47 | 31 | 107 | 40 | 63 |
| 2,4-dichlorobenzoic acid | 12 | 2.8 | 34 | 65 | 109 | 35 | 60 |
| para fluorobenzoic acid | 12.2 | 4.1 | 50 | 60 | 104 | 38 | 70 |
| para-oxyphenylbenzoic acid | 13.5 | 3.5 | 47 | 40 | 105 | 38 | 73 |
| 2-chloro-4-nitrobenzoic acid | 13 | 2 | 26 | 39 | 103 | 48 | 90 |
| 2-chloro-5-nitrobenzoic acid | 13 | 2.2 | 29 | 52 | 108 | 40 | 65 |
| Compositions not within the scope of the invention | | | | | | | |
| benzoic acid (sodium salt) | 13 | 4.2 | 55 | 88 | 99 | 45 | 90 |
| sodium para-tert-butylbenzoate | 14.1 | 4.4 | 62 | 109 | 92.5 | 55 | 150 |

Table 1 shows that the nucleating agents according to this invention which have a value of the parameter $\delta \times pK_{H2O}$ of less than about 55 and preferably also a ΔT value of more than about 100 cause clearly less degradation of the molecular structure of the polyethylene terephthalate than similar nucleating agents having a $\delta \times pK_{H2O}$ value of 55 or more.

EXAMPLE 6

PET has been dried 17 hours at 120° C. in a ventilated oven. 0.5% of sodium 2-chloro-4-nitrobenzoate has been dry blended with the polymer powder. The nucleated powder was extruded into pellets in a Werner Pfleiderer Twin screw extruder (ZSK 30).

| Extrusion conditions: | |
|---|---|
| Temperature of the melt | 296–302° C. |
| Screw speed | 200 rpm |
| Flow rate | 250 g/minute |
| Outgassing pressure | 100 mm Hg |

The following results are obtained:

| Tc (°C.) | 200 | 190 | 180 | 120 | 110 | 100 |
|---|---|---|---|---|---|---|
| $t_{\frac{1}{2}}$ (sec) | 34 | 21 | 13 | 15 | 35 | 80 |

EXAMPLE 7

The extruded product of Example 6 has been dried (120° C.) in a ventilated oven. The obtained pellets have been moulded by injection in a Buhler Rover 63 machine.

| Injection conditions: | |
|---|---|
| Mould temperature | 120° C. |
| Screw temperature | 260/270/290/288° C. |
| Injection pressure | 34 bars |

Different cycling times have been experimented. It has been found that even with a very short cycling time of 12 seconds, tough moulded articles were obtained which exhibit a melting temperature of 265° C. and a crystallinity of 40% (based on a heat of fusion of 24 Cal/g for the 100% crystalline PET).

EXAMPLE 8

With the same conditions of those of Example 6, except that 5% tritolyl phosphate (plasticiser) is added in the dry blend, the following results are obtained:

| Tc (°C.) | 200 | 190 | 180 | 120 | 110 |
|---|---|---|---|---|---|
| $t_{\frac{1}{2}}$ (sec) | 3% | 20 | 13 | 8 | 17 |

EXAMPLE 9

100 g of granulated polyethylene terephthalate (B 90 grade of polyethylene terephthalate manufactured by ICI, United Kingdom) are reacted with 1 g of sodium phenylacetate as described in Example 5. Samples for DSC examination were prepared according to the method of Example 5.

The following table shows the surprising crystallisation rate increase effect obtained when using the nucleating agents according to this invention.

The crystallisation isotherm is registered on a temperature-time graph and the peak appearing on the registered isotherm is taken as the half-crystallisation time ($t_{\frac{1}{2}}$).

| Tc (°C.) | 120 | 110 |
|---|---|---|
| $t_{\frac{1}{2}}$ (sec)[1] | 30 | 55 |
| $t_{\frac{1}{2}}$ (sec)[2] | 145 | >200 |

[1] Nucleated PET prepared by the method according to this invention;
[2] pure PET.

The degradation constant K, determined as hereinbefore described is less than 15.

EXAMPLE 10

The same method as described in Example 9 is used except that sodium 1-naphthylacetate is used as nucleating agent.

The following table gives the half-crystallisation time of the obtained mixture of PET containing 1% of sodium naphthylacetate.

| Tc (°C.) | 120 | 110 |
|---|---|---|
| $t_{\frac{1}{2}}$ (sec) | 30 | 55 |

The degradation constant of the PET nucleated with sodium 1-naphthylacetate is equal to 30.

EXAMPLE 12

Samples of polyethylene terephthalate (I.V.=0.73) containing 1% of the salts listed in Table 2 were prepared by compounding at 300° C. on a 2-roll mill for 2 minutes. The samples were evaluated to determine Tn(composition-Tn(polyester), the total number of end groups, the number of carboxylate groups and the number of hydroxyl and carboxyl groups.

TABLE 2

| Salt | End Groups (moles × $10^{-6}$g$^{-1}$) Total from solution I.V. | —OH | —COOH | Tn(composition)-Tn(polyester) |
|---|---|---|---|---|
| sodium benzoate | 136 | 54 | 44 | 27 |
| p-tert-butyl sodium benzoate | 157 | 56 | 83 | 19 |
| sodium o-chlorobenzoate | 167 | 55 | 45 | 26 |
| sodium 2,4-dichlorobenzoate | 192 | 55 | 67 | 23 |
| sodium p-chlorobenzoate | 157 | — | — | 23 |
| sodium 2,6-dichlorobenzoate | 153 | 56 | 51 | 25 |
| sodium p-hydroxybenzoate | 148 | 64 | 102 | 20 |
| sodium 2,6-dihydroxybenzoate | 127 | 69 | 55 | 24 |
| sodium 3,5-dihydroxybenzoate | 138 | — | — | 7 |
| sodium o-phenoxybenzoate | 173 | 54 | 77 | 25 |

EXAMPLE 13

The salts listed in Table 3 were deposited from solution on the surface of polyethylene terephthalate chip to give a concentration of 1% by weight of salt. The product was dried unner vacuum at 96° C. for 3 hours. The compositions were pressed into film using a temperature of 280° C. for 1 minute. The DSC measurements were made after quenching from the melt to prevent crystallisation and using a heating rate of 16° C./minute.

TABLE 3

| Salt | Dissociation constant | End Groups (moles × $10^{-6}$g$^{-1}$) Total from solution I.V. | —OH | —COOH | Tn (°C.) (16° C./min) | Tn(comp.)-Tn(PET) (16° C./min) | K |
|---|---|---|---|---|---|---|---|
| Sodium salt of 2-furoic acid | $68 \times 10^{-5}$ | 121 | 62 | 29 | 127 | — | 65 |
| Sodium salt of 2-naphthoic acid | $6.8 \times 10^{-5}$ | 121 | 60 | 31 | 120 | 25 | |

TABLE 3-continued

| Salt | Dissociation constant | End Groups (moles × $10^{-6}g^{-1}$) Total from solution I.V. | —OH | —COOH | Tn (°C.) (16° C./min) | Tn(comp.)-Tn(PET) (16° C./min) | K |
|---|---|---|---|---|---|---|---|
| Sodium salt of 2-biphenyl-carboxylic acid | $35 \times 10^{-5}$ | 133 | 60 | 26 | 121 | 22 | |
| Sodium salt of 4-biphenyl-carboxylic acid | — | 107 | 61 | 31 | 131 | 16 | |
| Sodium salt of 2-thiophen-carboxylic acid | $33 \times 10^{-5}$ | 145 | 59 | 24 | 112 | 29 | 15 |
| Sodium phenyl phosphinate | $3 \times 10^{-2}$ | — | 66 | 25 | 117 | — | |
| Calcium cyclohexyl phosphinate | — | — | — | — | 129 | — | |
| Sodium 1-naphthoate | $670 \times 10^{-5}$ | — | — | — | 111 | — | |
| Sodium 5-hydroxy-1-naphthoate | — | — | — | — | 132 | — | |
| Sodium 8-bromo-1-naphthoate | — | — | — | — | 124 | — | |
| Sodium 6-hydroxy-2-naphthoate | — | — | — | — | 116 | — | |
| Sodium 6-methoxy-2-naphthoate | — | — | — | — | 119 | — | |
| 3-hydroxy-2-naphthoate | — | 122 | 60 | 32 | 118 | 27 | 20 |

EXAMPLE 14

1% by weight of the sodium salt of saccharin was deposited on the surface of granules of a polyethylene terephthalate homopolymer of I.V.=0.73 by evaporating an aqueous solution of the salt from the granules by drying at 96° C. under vacuum for 3 hours. The granules obtained were compression moulded into film by pressing at 280° C. for 60 second. The film was used for measurements of Tn at a heating rate of 16° C./minute. A value of Tn of 112° C. was obtained compared with a value of 148.5° C. obtained for the polyester itself containing no nucleating additive. The product had a K value of 9.

COMPARATIVE EXAMPLE A

The effect of the salts listed in Table 4 was determined by taking granules of a polymer of poly(ethylene terephthalate) homopolymer having an intrinsic viscosity of 0.73 and evaporating a solution of the salt in methanol or water from the surface of the granules by drying at 96° C. under vacuum for 3 hours. The proportions of polymer and solution used were such as to give a concentration of 1% of salt by weight of the final dry composition. The granules obtained were compression-moulded into film at 280° C. for various periods of time. The film was used for measurement of Tn as hereinbefore described.

TABLE 4

| Salt | Dissociation Constant | Time in Press (sec) | Tn (°C.) |
|---|---|---|---|
| Sodium monomethyl terephthalate | $30 \times 10^{-5}$ | 30 | — |
| | | 60 | 132 |
| Potassium monomethyl terephthalate | $30 \times 10^{-5}$ | 30 | 138.5 |
| | | 60 | 137.5 |
| Potassium hydrogen orthophthalate | $130 \times 10^{-5}$ | 30 | 142.5 |
| | | 60 | 144.5 |
| Disodium terephthalate | $30 \times 10^{-5}$ (First dissociation constant) | 30 | 141 |
| | | 60 | 140 |
| Sodium benzene sulphonate | $2 \times 10^{-1}$ | 30 | 146 |
| | | 60 | 141.5 |

TABLE 4-continued

| Salt | Dissociation Constant | Time in Press (sec) | Tn (°C.) |
|---|---|---|---|
| Sodium benzoate | $6.27 \times 10^{-5}$ | 30 | 115.5 |
| | | 60 | 117 |
| NIL | — | 30 | 152.5 |
| | | 60 | 148.5 |

EXAMPLE 15

Two samples of polyethylene terephthalate chip (I.V.=0.73) were coated from solution with 1% of the sodium salt of o-hydroxybenzoic acid and the disodium salt of the same acid respectively. After drying for 3 hours in a vacuum oven at 95° C. films were prepared by pressing the products for 1 minute at 280° C. The products were found to have Tn values measured at a heating rate of 16° C./minute of 114° C. and 108° C. respectively. The K values for the two compositions are 26 and 24 respectively.

EXAMPLE 16

A block copolymer containing 5% by weight of polyethylene glycol units of molecular weight 1540 in chip form was blended with a solution of the sodium salt of o-chlorobenzoic acid to give a salt concentration of 1% by weight of the polyester. Samples were prepared for DSC analysis using the procedure of Example 15. The composition was found to have a Tn value of 102° C. using a heating rate of 16° C./minute.

EXAMPLE 17

The polymer used in Example 16 and 1% of the disodium salt of o-hydroxy benzoic acid were compounded on a 2-roll mill at 270° C. for 2 minutes. The product was prepared for DSC analysis as described in Example 5 and was found to have a Tn of 100° C. (measured at a heating rate of 10° C./minute). The total number of end groups determined from the intrinsic viscosity of the polymer was found to be 137.

I claim:

1. A fast crystallising polyester composition obtained by reacting a polyester which is a block copolyester containing the repeating polymeric segments A and B, wherein A is a polymeric segment of ethylene terephthalate units and B is a polymeric segment having a glass-transition temperature of less than 0° C.

the concentration of the segments of A being at least 90 mole % and the concentration of the segments of B being between 0.05 and 10 mole % of the block copolyester, with an ionisable metal salt of an organic compound having at least one acidic proton and at least one aromatic ring in which the ionisable metal salt is one which, when present in polyethylene terephthalate at a concentration of 1% by weight, will:

(a) give a difference in the crystallisation peak temperatures ($\Delta T=Tc-Tn$) of at least 100° C. measured by differential scanning calorimetry on heating (Tn) and on cooling (Tc) using heating and cooling rates of 10° C./minute, and (b) has a melt degradation value (K value) measured in polyethylene terephthalate according to the method given in Makromol Chem 179, 2201–2209 (1978) of less than 60.

2. A polyester composition according to claim 1 wherein the B segment has a glass-transition temperature of less than 20° C. and the concentration of the segments of B is between 0.1 and 5 mole %.

3. A polyester composition according to claim 1 wherein the ionisable salt is selected from salts of an organic acid of the group comprising carboxylic, sulphinic, phosphonic and phosphinic acids and phenols.

4. A polyester composition according to claim 3 in which the ionisable salt is selected from salts of an aromatic organic acid which contains single, multiple or fused aromatic rings.

5. A polyester composition according to claim 3 in which the dissociation constant of the organic acid is less than $10^{-1}$.

6. A polyester composition according to claim 4 wherein the organic acid has the formula:

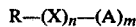

$$R-(X)_n-(A)_m$$

where A is an acid group selected from the carboxylic, sulphinic, phosphonic, phosphinic and phenol groups, m is an integer which is at least one, X is a direct link or is a —CH=CH— or a —CH$_2$— group, n is an integer between 1 and 4 and R is an aromatic structure consisting of single, fused or multiple aromatic rings.

7. A polyester composition according to claim 6 wherein A is a carboxylic acid group.

8. A polyester composition according to claim 7 wherein X is a direct link, R is a single aromatic ring, m is 1 and R contains at least one substituent group other than the carboxylic acid group.

9. A polyester composition according to claim 8 wherein the substituent group other than the carboxylic acid group is selected from nitro, halogen, hydroxy, phenol and oxy-phenol radicals.

10. A polyester composition according to claim 1 in which the metal of the ionisable metal salt is selected from sodium, lithium, potassium or calcium.

11. A polyester composition according to claim 1 containing a plasticiser for the polyester.

12. A polyester composition according to claim 1 containing from 5 to 80% by weight of the composition of a particulate or fibrous filler.